United States Patent
Chandramouli et al.

(10) Patent No.: US 9,294,924 B2
(45) Date of Patent: Mar. 22, 2016

(54) MONITORING SUSPICIOUS EVENTS IN A CELLULAR NETWORK

(75) Inventors: Devaki Chandramouli, Plano, TX (US); Rainer Liebhart, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/391,793

(22) PCT Filed: Apr. 13, 2012

(86) PCT No.: PCT/US2012/033511
§ 371 (c)(1),
(2), (4) Date: Nov. 17, 2014

(87) PCT Pub. No.: WO2013/154576
PCT Pub. Date: Oct. 17, 2013

(65) Prior Publication Data
US 2015/0111533 A1     Apr. 23, 2015

(51) Int. Cl.
*H04M 1/66*     (2006.01)
*H04W 12/12*    (2009.01)
(Continued)

(52) U.S. Cl.
CPC ........... *H04W 12/12* (2013.01); *H04L 63/1408* (2013.01); *H04L 67/22* (2013.01); *H04W 4/005* (2013.01)

(58) Field of Classification Search
CPC ......... H04L 63/02; H04L 41/24; H04L 63/00; H04L 41/12; H04L 63/1408; H04L 67/22; H04W 12/10; H04W 24/10; H04W 12/12; H04W 4/005; G06F 21/563; G06F 21/53
USPC .......... 455/410, 67.11; 370/252; 726/11, 224, 726/24, 22
See application file for complete search history.

(56) References Cited

U.S. PATENT DOCUMENTS 6,304,975 B1 * 10/2001 Shipley .................. H04L 63/02
                                                    726/11
7,376,969 B1 *  5/2008 Njemanze ............... G06F 21/55
                                                    709/224

(Continued)

FOREIGN PATENT DOCUMENTS

WO    2011/054299 A1    5/2011
WO    2011/084011 A2    7/2011

OTHER PUBLICATIONS

International Search Report and Written Opinion dated Jun. 22, 2012 corresponding to International Patent Application No. PCT/US2012/033511.

(Continued)

*Primary Examiner* — Mahendra Patel
(74) *Attorney, Agent, or Firm* — Squire Patton Boggs (US) LLP

(57) ABSTRACT

Communication systems, including cellular networks, and the devices that are connected to them, can have both legitimate and illegitimate uses. Such communication systems, including systems that utilize, permit, or leverage machine-type-communications, may benefit from monitoring for suspicious events. A method can include receiving a monitoring request regarding a user equipment or a category of devices. The method can also include performing a monitoring activity regarding the user equipment or the category of devices with respect to at least one suspicious event. The method can further include responding to the monitoring request indicating whether monitoring will be performed for the user equipment or the category of devices.

17 Claims, 8 Drawing Sheets

(51) Int. Cl.
   *H04L 29/08* (2006.01)
   *H04L 29/06* (2006.01)
   *H04W 4/00* (2009.01)

(56) References Cited

U.S. PATENT DOCUMENTS

| | | | |
|---|---|---|---|
| 2004/0158630 A1* | 8/2004 | Chang | H04L 41/24 709/224 |
| 2006/0218395 A1 | 9/2006 | Maes | |
| 2007/0174915 A1* | 7/2007 | Gribble | G06F 21/53 726/24 |
| 2008/0216158 A1* | 9/2008 | Imbimbo | H04L 63/00 726/4 |
| 2009/0150997 A1* | 6/2009 | Park | G06F 21/563 726/22 |
| 2009/0271469 A1* | 10/2009 | Benco | H04N 21/8146 709/201 |
| 2010/0023598 A9* | 1/2010 | Ginter | G06F 21/55 709/217 |
| 2010/0093284 A1* | 4/2010 | Terrero Diaz-Chiron | H04W 24/10 455/67.11 |
| 2010/0165862 A1* | 7/2010 | Nylander | H04L 41/12 370/252 |
| 2011/0270973 A1 | 11/2011 | Liao | |
| 2012/0220326 A1 | 8/2012 | Li et al. | |
| 2013/0157616 A1* | 6/2013 | Berg | H04L 41/00 455/410 |
| 2013/0173898 A1* | 7/2013 | Berg | H04W 12/10 713/2 |

OTHER PUBLICATIONS

3GPP TS 23.401 V11.1.0 (Mar. 2012), Technical Specification, 3rd Generation Partnership Project; Technical Specification Group Services and System Aspects; General Packet Radio Service (GPRS) Enhancements for Evolved Universal Terrestrial Radio Access Network (E-UTRAN) access (Release 11), Mar. 2012, 284 pages.

3GPP TS 23.682 V11.0.0 (Mar. 2012), Technical Specification, 3rd Generation Partnership Project; Technical Specification Group Services and System Aspects; Architecture Enhancements to Facilitate Communications with Packet Data Networks and Applications (Release 11), Mar. 2012, 24 pages.

3GPP TS 22.368 V11.4.0 (Mar. 2012), Technical Specification, 3rd Generation Partnership Project; Technical Specification Group Services and System Aspects; Service Requirements for Machine-Type Communications (MTC); Stage 1 (Release 11), Mar. 2012, 25 pages.

3GPP TS 23.888 V1.6.1 (2012-02), Technical Specification, 3rd Generation Partnership Project; Technical Specification Group Services and System Aspects; System Improvements for Machine-Type Communications (Release 11), Feb. 2012, 165 pages.

Supplementary European Search Report dated Nov. 27, 2015 corresponding to European Patent Application No. 12874140.2.

3GPP TR 33.868 V0.7.0 (Feb. 2012), Technical Report, 3rd Generation Partnership Project; Technical Specification Group Services and System Aspects; Security aspects of Machine-Type Communications; (Release 11), Feb. 29, 2012, XP050577595, 48 pages.

* cited by examiner

MONITORING SUSPICIOUS EVENTS IN A CELLULAR NETWORK

BACKGROUND

1. Field

Communication systems, including cellular networks, and the devices that are connected to them, can have both legitimate and illegitimate uses. Such communication systems, including systems that utilize, permit, or leverage machine-type-communications, may benefit from monitoring for suspicious events.

2. Description of the Related Art

The evolved packet system (EPS), the successor of general packet radio system (GPRS), provides radio interfaces and packet core network functions for broadband wireless data access. EPS core network functions include the mobility management entity (MME), the packet data network gateway (PDN-GW) and the Serving Gateway (S-GW). An example of an evolved packet core architecture is illustrated in FIG. 1 and is described by third generation partnership project (3GPP) technical specification (TS) 23.401, which is incorporated herein by reference in its entirety. A common packet domain core network can be used for both radio access networks (RANs), the global system for mobile communication (GSM) enhanced data rates for GSM evolution (EDGE) radio access network (GERAN) and the universal terrestrial radio access network (UTRAN).

For machine-type-communication (MTC) a functional entity called MTC interworking function (MTC-IWF) and several new interfaces, including S6m, Tsp, Tsms, T5a/b/c and T4, have been introduced to the 3GPP architecture. FIG. 2 illustrates machine-type-communication additions to the 3GPP architecture, as well as the various interfaces identified. The MTC-IWF and the new interfaces in 3GPP Release 11 (Rel 11) can, for example, enable triggering of devices with or without a mobile subscriber integrated services digital network number (MSISDN) from an internal or external MTC server. The triggering of the devices may be, for example, in order to establish a packet data network (PDN) connection and/or packet data protocol (PDP) context. A 3GPP architecture for machine-type communication is discussed in 3GPP TS 23.682, which incorporated herein by reference in its entirety.

SUMMARY

According to certain embodiments, a method includes receiving a monitoring request regarding a user equipment or a category of devices. The method also includes performing a monitoring activity regarding the user equipment or the category of devices with respect to at least one suspicious event. The method further includes responding to the monitoring request indicating whether monitoring will be performed for the user equipment or the category of devices.

In certain embodiments, a method includes requesting monitoring of a user equipment or a category of devices with respect to at least one suspicious event. The method also includes receiving a response to the monitoring request, wherein the response indicates a registration status of the monitoring.

A method, according to certain embodiments, includes receiving a request for monitoring a user equipment or category of devices with respect to at least one suspicious event. The method also includes determining whether the monitoring is permitted. The method further includes responding to the request based on whether the monitoring is permitted.

According to certain embodiments, a method includes monitoring for a suspicious event with respect to a user equipment or a category of devices for which monitoring has been requested by a requestor. The method also includes detecting an occurrence of the suspicious event with respect to the user equipment or the category of devices. The method further includes reporting the occurrence to the requestor.

A method, in certain embodiments, includes receiving a report of suspicious activity with respect to a user equipment or a category of devices for which monitoring has been requested by a requestor. The method also includes forwarding the report of the suspicious activity to the requestor.

A method, according to certain embodiments, includes receiving a report of suspicious activity with respect to a user equipment or a category of devices for which monitoring has been requested by a user or subscriber of the user equipment. The method also includes reporting the suspicious activity to the user or the subscriber.

In certain embodiments, an apparatus includes at least one processor and at least one memory including computer program code. The at least one memory and the computer program code are configured to, with the at least one processor, cause the apparatus at least to receive a monitoring request regarding a user equipment or a category of devices. The at least one memory and the computer program code are also configured to, with the at least one processor, cause the apparatus at least to perform a monitoring activity regarding the user equipment or the category of devices with respect to at least one suspicious event. The at least one memory and the computer program code are further configured to, with the at least one processor, cause the apparatus at least to respond to the monitoring request indicating whether monitoring will be performed for the user equipment or the category of devices.

According to certain embodiments, an apparatus includes at least one processor and at least one memory including computer program code. The at least one memory and the computer program code are configured to, with the at least one processor, cause the apparatus at least to request monitoring of a user equipment or a category of devices with respect to at least one suspicious event. The at least one memory and the computer program code are also configured to, with the at least one processor, cause the apparatus at least to receive a response to the monitoring request, wherein the response indicates a registration status of the monitoring.

An apparatus, according to certain embodiments, includes at least one processor and at least one memory including computer program code. The at least one memory and the computer program code are configured to, with the at least one processor, cause the apparatus at least to receive a request for monitoring a user equipment or category of devices with respect to at least one suspicious event. The at least one memory and the computer program code are also configured to, with the at least one processor, cause the apparatus at least to determine whether the monitoring is permitted. The at least one memory and the computer program code are further configured to, with the at least one processor, cause the apparatus at least to respond to the request based on whether the monitoring is permitted.

An apparatus, in certain embodiments, includes at least one processor and at least one memory including computer program code. The at least one memory and the computer program code are configured to, with the at least one processor, cause the apparatus at least to monitor for a suspicious event with respect to a user equipment or a category of devices for which monitoring has been requested by a requestor. The at least one memory and the computer program code are also configured to, with the at least one processor, cause the apparatus at least to detect an occurrence of the suspicious event with respect to the user equipment or the category of devices. The at least one memory and the computer program code are further configured to, with the at least one processor, cause the apparatus at least to report the occurrence to the requestor.

An apparatus includes at least one processor and at least one memory including computer program code in certain embodiments. The at least one memory and the computer program code are configured to, with the at least one processor, cause the apparatus at least to receive a report of suspicious activity with respect to a user equipment or a category of devices for which monitoring has been requested by a requestor. The at least one memory and the computer program code are also configured to, with the at least one processor, cause the apparatus at least to forward the report of the suspicious activity to the requestor.

According to certain embodiments, an apparatus includes at least one processor and at least one memory including computer program code. The at least one memory and the computer program code are configured to, with the at least one processor, cause the apparatus at least to receive a report of suspicious activity with respect to a user equipment or a category of devices for which monitoring has been requested by a user or subscriber of the user equipment. The at least one memory and the computer program code are also configured to, with the at least one processor, cause the apparatus at least to report the suspicious activity to the user or the subscriber.

In certain embodiments, an apparatus includes receiving means for receiving a monitoring request regarding a user equipment or a category of devices. The apparatus also includes performing means for performing a monitoring activity regarding the user equipment or the category of devices with respect to at least one suspicious event. The apparatus further includes responding means for responding to the monitoring request indicating whether monitoring will be performed for the user equipment or the category of devices.

An apparatus, in certain embodiments, includes requesting means for requesting monitoring of a user equipment or a category of devices with respect to at least one suspicious event. The apparatus also includes receiving means for receiving a response to the monitoring request, wherein the response indicates a registration status of the monitoring.

An apparatus, according to certain embodiments, includes receiving means for receiving a request for monitoring a user equipment or category of devices with respect to at least one suspicious event. The apparatus also includes determining means for determining whether the monitoring is permitted. The apparatus further includes responding means for responding to the request based on whether the monitoring is permitted.

According to certain embodiments, an apparatus includes monitoring means for monitoring for a suspicious event with respect to a user equipment or a category of devices for which monitoring has been requested by a requestor. The apparatus also includes detecting means for detecting an occurrence of the suspicious event with respect to the user equipment or the category of devices. The apparatus further includes reporting means for reporting the occurrence to the requestor.

An apparatus, in certain embodiments, includes receiving means for receiving a report of suspicious activity with respect to a user equipment or a category of devices for which monitoring has been requested by a requestor. The apparatus also includes forwarding means for forwarding the report of the suspicious activity to the requestor.

In certain embodiments, an apparatus includes receiving means for receiving a report of suspicious activity with respect to a user equipment or a category of devices for which monitoring has been requested by a user or subscriber of the user equipment. The apparatus also includes reporting means for reporting the suspicious activity to the user or the subscriber.

A non-transitory computer readable medium is, in certain embodiments, encoded with instructions that, when executed in hardware, perform a process. The process includes receiving a monitoring request regarding a user equipment or a category of devices. The process also includes performing a monitoring activity regarding the user equipment or the category of devices with respect to at least one suspicious event. The process further includes responding to the monitoring request indicating whether monitoring will be performed for the user equipment or the category of devices.

According to certain embodiments, a non-transitory computer readable medium encoded with instructions that, when executed in hardware, perform a process. The process includes requesting monitoring of a user equipment or a category of devices with respect to at least one suspicious event. The process also includes receiving a response to the monitoring request, wherein the response indicates a registration status of the monitoring.

A non-transitory computer readable medium is, according to certain embodiments, encoded with instructions that, when executed in hardware, perform a process. The process includes receiving a request for monitoring a user equipment or category of devices with respect to at least one suspicious event. The process also includes determining whether the monitoring is permitted. The process further includes responding to the request based on whether the monitoring is permitted.

A non-transitory computer readable medium is, in certain embodiments, encoded with instructions that, when executed in hardware, perform a process. The process includes monitoring for a suspicious event with respect to a user equipment or a category of devices for which monitoring has been requested by a requestor. The process also includes detecting an occurrence of the suspicious event with respect to the user equipment or the category of devices. The process further includes reporting the occurrence to the requestor.

In certain embodiments, a non-transitory computer readable medium is encoded with instructions that, when executed in hardware, perform a process. The process includes receiving a report of suspicious activity with respect to a user equipment or a category of devices for which monitoring has been requested by a requestor. The process also includes forwarding the report of the suspicious activity to the requestor.

According to certain embodiments, a non-transitory computer readable medium is encoded with instructions that, when executed in hardware, perform a process. The process includes receiving a report of suspicious activity with respect to a user equipment or a category of devices for which monitoring has been requested by a user or subscriber of the user equipment. The process also includes reporting the suspicious activity to the user or the subscriber.

BRIEF DESCRIPTION OF THE DRAWINGS

For proper understanding of the invention, reference should be made to the accompanying drawings, wherein.

DETAILED DESCRIPTION

Figure 1:
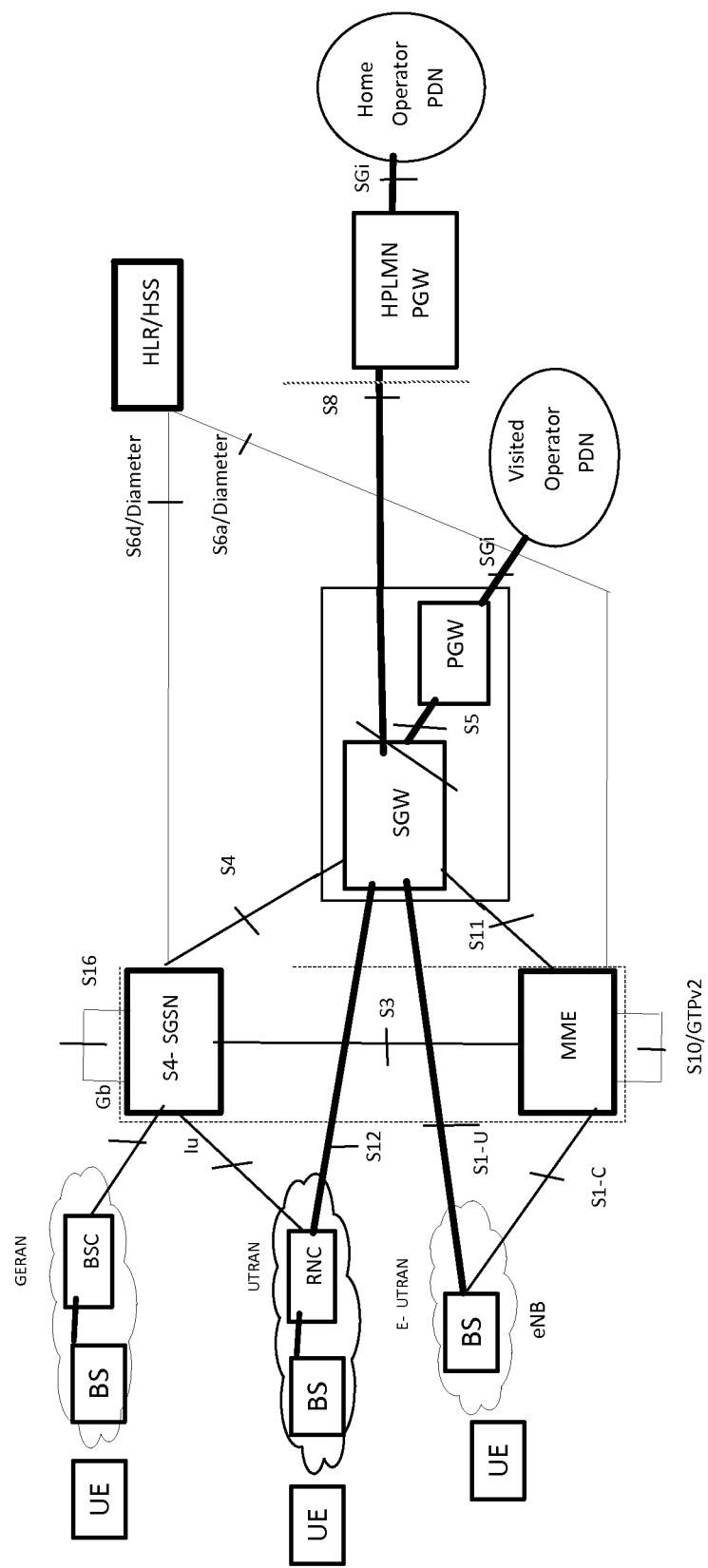
FIG. 1 illustrates an evolved packet core architecture.
Figure 2:
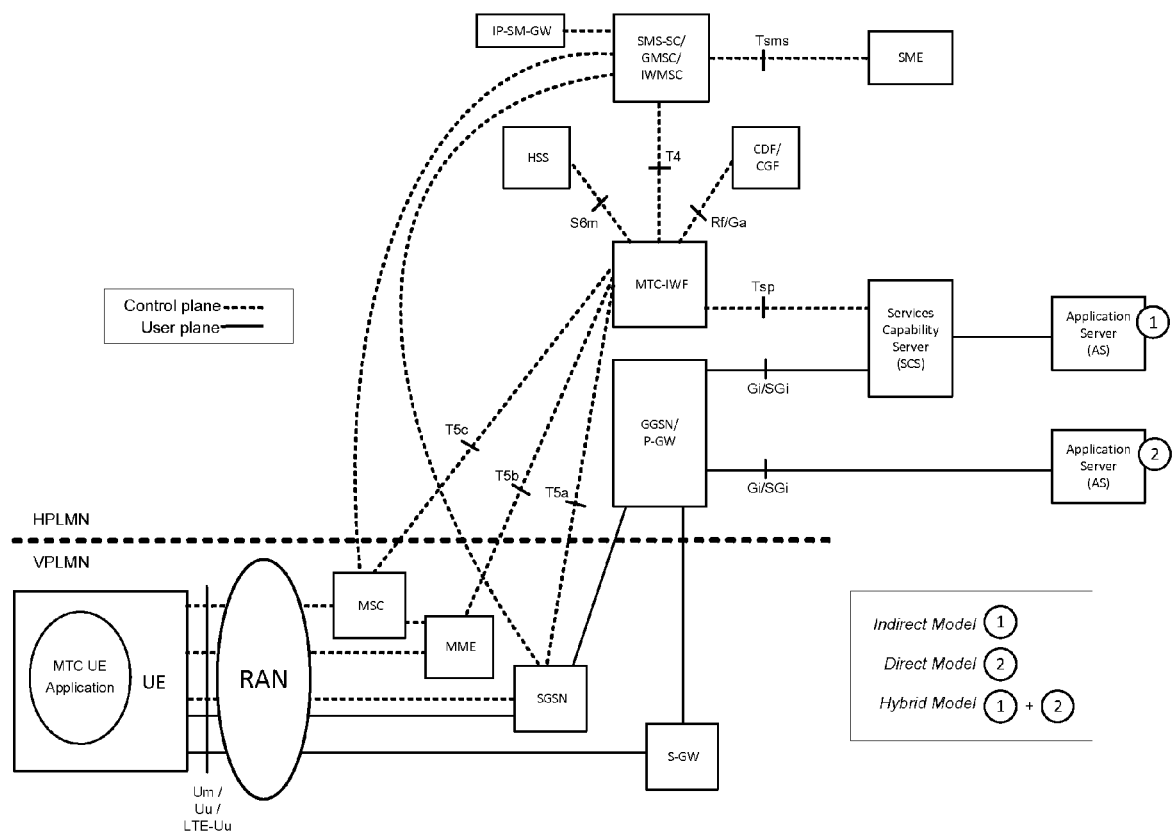
FIG. 2 illustrates machine-type-communication additions to a third generation partnership project architecture.

Machine-type-communication (MTC) monitoring is one example of machine-type-communication related features. Because machine-type devices can be deployed in remote areas and in locations where they are not monitored actively by humans, theft and vandalism risks differ from cases where there is constant or frequent human monitoring. Accordingly, a network can provide a mechanism to auto-detect suspicious activities. Suspicious activities, in this context, can include, for example, change of association between user equipment (UE) and universal integrated circuit card (UICC), loss of connectivity, communication failure, change of location, and in general any behavior that is not aligned with subscribed features. These events are neither detected nor reported by conventional networks. Certain embodiments, however, enable detection of events and report of these events as and when they occur so that the service provider, user, or law enforcement agency can take appropriate action.

Some of these useful services may be applied to, for example, smart meters or remote surveillance systems. The service can also be extended to normal devices, such as smart phones, by the mobile network operator, for example.

Certain embodiments, thus, provide a monitoring feature. This feature may be able to detect suspicious activities for unmanned devices and devices that are at risk of being stolen or manipulated.

Embodiments can include at least three aspects. A first aspect relates to a procedure to register for monitoring service. A second aspect relates to an ability to detect suspicious events, such as those events described above or similar events. A third aspect relates to a procedure to report suspicious events as and when they occur.

Certain embodiments also address the impact on the core network (CN) due to user equipment mobility. A direct interface can be used between the machine-type-communication inter-working function (MTC-IWF) and the nodes performing monitoring of certain events. This direct interface can be, for example, T5a/b/c between MTC-IWF and MME/SGSN/MSC as in Annex B of 3GPP TS 23.682, or an interface between MTC-IWF and HSS like S6m. Use of other interfaces is also permitted.

Monitoring of certain events can be triggered by an external services capability server (SCS) as described in 3GPP TS 23.682, by any other application server inside or outside the operator domain or by the network itself based on subscription data stored in the HSS. Subscription data containing the events that are to be monitored can be downloaded to the MTC-IWF or directly to the serving nodes, MME, SGSN, and MSC, during device registration. The subscription data can be accompanied by a request for the serving nodes to detect these events.

Serving nodes may monitor suspicious events for a defined period of time, such as for the duration of validity time. Upon detection of suspicious events, serving nodes, MME, SGSN, and MSC, can report to the requestor MTC-IWF. Alternatively, the serving nodes can report to a pre-configured application server or can store this information as part of charging, for example, charging data records (CDRs), or other records.

Various procedures can be used to register for monitoring service. Two possible alternatives available for a services capability server to register for monitoring service with the network are discussed below.

Figure 3:
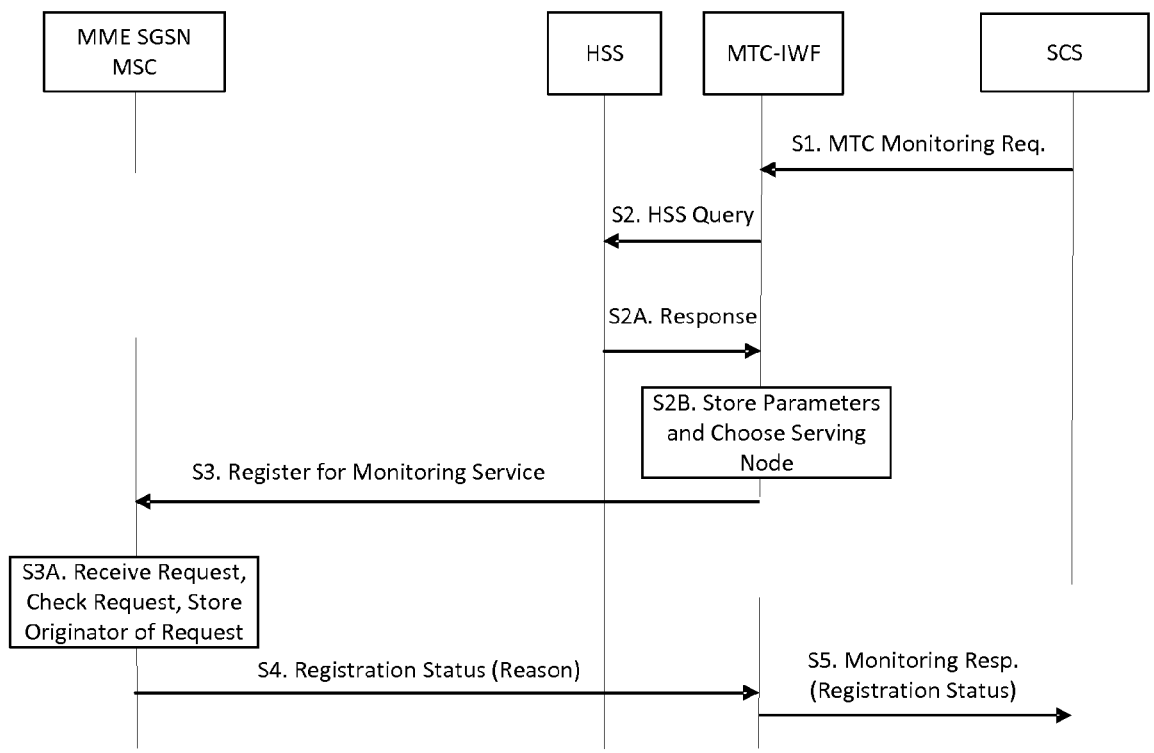
FIG. 3 illustrates direct interface registration for monitoring according to certain embodiments.

In a first alternative, illustrated in FIG. 3, a direct interface is used to register for monitoring service. More particularly, FIG. 3 illustrates a simplified call flow to register for monitoring service, using a direct interface such as T5a/b/c.

As shown in FIG. 3, at S1, a services capability server (SCS) can initiate a request over, for example, Tsp to send a monitoring request to MTC-IWF for a certain device identified by its external identifier (URI or NAI) or MSISDN. This could be a generic request that includes all types of monitoring events or it could be a specific request for certain types of monitoring events. This may depend on the service level agreements between mobile operator and service provider. The MTC monitoring request can include an external identifier (ID) or MSISDN and optionally service type(s), validity time, and a list of serving node(s).

At S2, the MTC-IWF can receive the request from the SCS and can query the home subscriber server (HSS) to obtain the following information such as international mobile subscriber identity (IMSI), serving node identifier(s) and subscription information for monitoring services. In addition, HSS authenticates the request from SCS for monitoring the target user equipment, and at S2A provides a response.

Upon successful response from HSS with any needed parameters such as IMSI and a list of serving nodes, the MTC-IWF can, at S2B, store the relevant parameters and choose, based on the events to be monitored and serving node capabilities, the appropriate serving node. Some events may be directly monitored and reported by the HSS.

Then, at S3, the MTC-IWF can send a request to register for monitoring service. The request can include an IMSI and MTC-IWF ID and can optionally include service type(s), validity time, and a list of serving node(s).

At S3A, the serving node can receive the request, check if the user equipment is currently registered in the network, and store originator for the request. Storing the originator can include storing the MTC-IWF ID.

Moreover, at S4, upon a determination that the user equipment is currently registered in the network, the serving node can register the user equipment for the requested monitoring event(s) and report the registration status to the MTC-IWF. If the user equipment is not currently registered or there is some other reason for non-registration, such information can also be relayed to the MTC-IWF including the reason, if desired.

More specifically, the serving node can generate the necessary CDR information for charging. Registering at the serving node may imply setting a flag e.g. "UMS—UE monitoring service". Note when the serving node receives this registration request from the HSS, if this flag is already set for the corresponding service, then the serving node simply needs to add "IWF ID" to the list of requestor.

If the user equipment is currently not registered in the network and/or the serving node is unaware of the target user equipment context, then the serving node can respond with a failure indication to the MTC-IWF and can indicate the cause for the failure or can forward the monitoring request to the other serving nodes, which were present in the request, with the MTC-IWF identifier. The serving node can then perform the monitoring for the period specified in the validity time.

At S5, the IWF can respond to the SCS with the registration status for monitoring service, so the result can be forwarded to the application server and appropriate action can be taken in case of failure.

Figure 4:
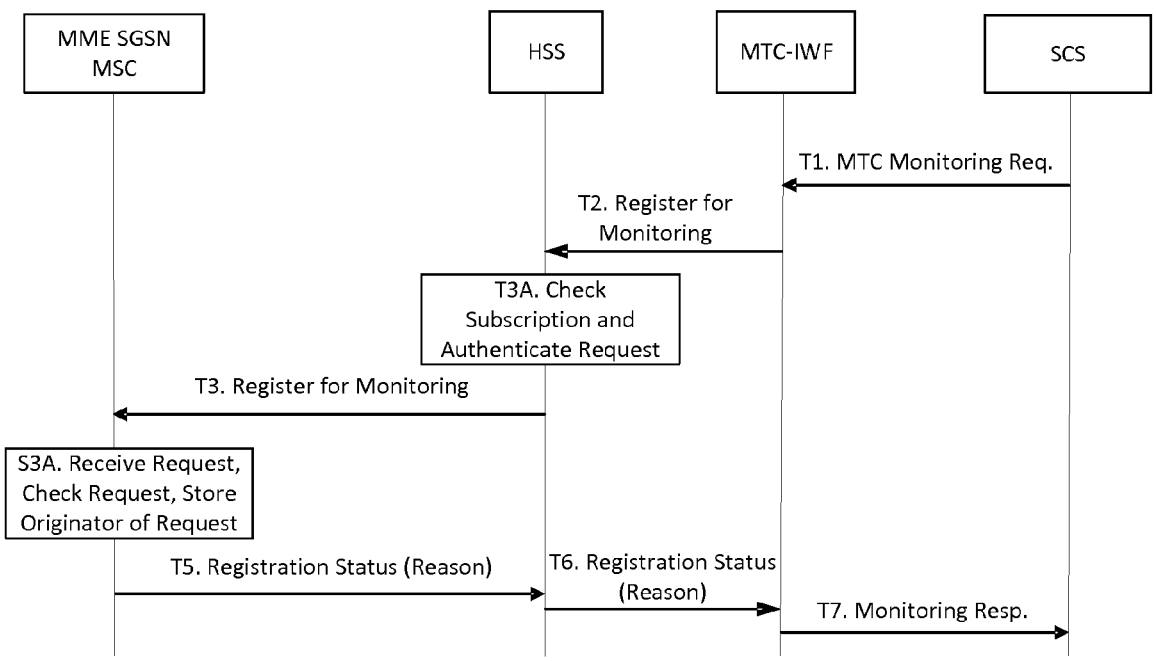
FIG. 4 illustrates a simplified call flow to register for monitoring service according to certain embodiments.

FIG. 4 illustrates a simplified call flow to register for monitoring service according to certain embodiments. In this example, the registering is via an HSS using an interface, such as S6m.

As shown in FIG. 4, at T1, a services capability server (SCS) can initiate a request over Tsp to send a monitoring request to MTC-IWF for a certain device identified by its external identifier, for example its uniform resource identifier (URI) or network access identifier (NAI), or MSISDN. This could be a generic request that includes all types of monitoring services or it could be a specific request for a certain type of monitoring service. This may depend on the service level agreements between mobile operator and service provider. The MTC monitoring request can include an external identifier (ID) or MSISDN and optionally service type(s), validity time, and a list of serving node(s).

At T2, the MTC-IWF can receive the request, identify the appropriate HSS to register for the monitoring service, and send a request to the HSS with ext ID or MSISDN, and IWF ID, and optionally including other parameters including requested monitoring event(s) and validity time for the monitoring service.

At T3A, the HSS can check the user's subscription for monitoring service and can authenticate the request from the SCS for monitoring the target user equipment. Upon successful authentication and validation of subscription, the HSS can identify the latest registered serving node, validate its support for monitoring service and, at T3, register for monitoring service with the serving node. The message registering for monitoring can include, for example, an IMSI of the user equipment, as well as other parameters, such as service type(s) or validity time.

At T4, the serving node can receive the request and check if the user equipment is currently registered with it. If the user equipment is registered, then the serving node can register the user equipment for the requested monitoring service(s). The serving node can generate the necessary CDR information for charging. Registering at the serving node may imply setting a flag, for example, "UMS—UE monitoring service". When the serving node receives this registration request from the HSS, if this flag is already set for the corresponding service, then no further action needs to be performed by the serving node to register the user equipment. The serving node can perform the monitoring for the period specified in the validity time.

If the user equipment is currently not registered and/or the serving node is unaware of the target user equipment context, then at T5 it can respond with a failure indication to the HSS and can indicate the cause or reason for the failure. If the registration is successful, it can respond at T5 with the success.

At T6, the HSS can forward the response to the IWF. Then, at T7, the IWF can respond to the SCS with the registration status for monitoring service, so that the result can be forwarded to the application server and appropriate action can be taken in case of failure.

Suspicious event detection can be performed in various ways and various events can be determined to be suspicious. For example, the following are some activities that could be defined as "occurrence of suspicious activities" at the serving nodes, such as the MME, SGSN, MSC.

A first suspicious scenario can occur when a user equipment is subscribed with a low mobility feature and is confined to a certain paging area. In this case, the MME/SGSN/MSC, referring to any one or combination of these or similar serving nodes, can detect and report suspicious activity if the user equipment is performing a tracking area update from a location that is not part of the user equipment's subscription, such as a cell ID that is not within the paging area specified in the user equipment subscription.

A second suspicious scenario can occur when user equipment is subscribed with a time tolerant and/or time controlled feature and is supposed to access the network only within an "allowed time interval" and cannot access within the "forbidden time interval". In this case, the MME/SGSN/MSC can detect and report suspicious activity if the user equipment is accessing the network outside the allowed time interval or at the forbidden time interval.

In a third suspicious scenario, a user equipment can be subscribed for packet switched only services. If the user equipment is subscribed for packet switched only services, but the user equipment is performing a location update to a mobile switching center (MSC) to obtain voice service, then the MSC can detect this.

A fourth suspicious scenario can include increased data usage. If, for example, the user equipment is subscribed for a certain access point name aggregated maximum bit rate (APN-AMBR) but the serving nodes, with the help of entities managing user plane such as the eNB, RNC, P-GW, GGSN or another network element in the PCC infrastructure in the case of EPS, GPRS, detect that the usage has exceeded the allowed limit in the subscription, then the serving nodes can detect increased data usage.

These four scenarios are example of suspicious scenarios, although other scenarios are also possible. For example, if a particular device that the system has determined is a permanently stationary device, such as a smart meter, attempts a handover from a home network to a visited network or roams into a visited network, this may be deemed a suspicious event, if the device's subscription does not include roaming service.

The services capability server can either register for all the suspicious activities specified here, or other suspicious activities, or register simply for a specific event, such as increased data usage. The nature of the monitoring event deployed in the operator's network can depend on the subscription model and subscription for the individual device. The nature of the monitoring event deployed can also depend on the service level agreements between the mobile operator and the service provider. It is also possible that the network itself can monitor certain events based on the respective subscription data stored in the HSS.

Various procedures can be used to report suspicious activities. Depending on the procedure adopted to register for monitoring, a corresponding procedure can be used to report suspicious activities. Thus, there are at least two alternative approaches available to report suspicious activities, corresponding to the two alternative approaches for monitoring already outlined above.

Figure 5:
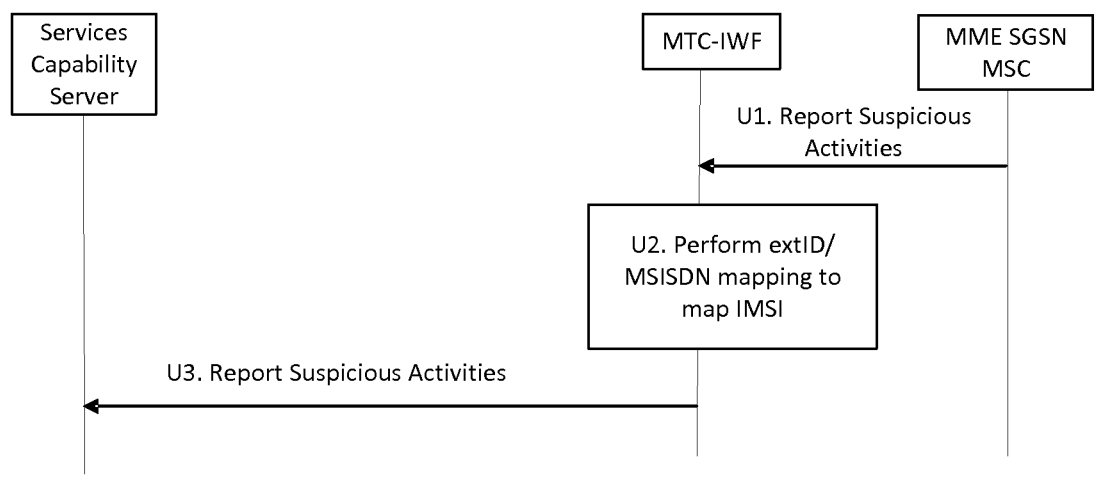
FIG. 5 illustrates direct interface reporting according to certain embodiments.

FIG. 5 illustrates direct interface reporting according to certain embodiments. More particularly, FIG. 5 illustrates a simplified call flow to report suspicious activity using a direct interface such as T5a/b/c.

As shown in FIG. 5, at U1, upon detection of suspicious activity based on registered event(s) the serving nodes, for example MME, SGSN, and/or MSC, can report the suspicious activity to a node that requested monitoring. In this case, the MTC-IWF is the node that requested. The report can include a corresponding IMSI for user equipment identification, as well as description or other identifier of the suspicious event, if, for example, more than one kind of event is being monitored.

At U2, the MTC-IWF can use a cached IMSI to perform extID/MSISDN mapping to map the IMSI to extID/MSISDN in the report. At U3, the MTC-IWF can forward the report to the services capability server. The report can include the extID or MSISDN, as well as some description or indication, explicit or implicit, of the event detected. The SCS may forward this to the corresponding application server that is eventually responsible for alerting the user. Alternatively, the suspicious activity can be reported to a law enforcement agency.

Figure 6:
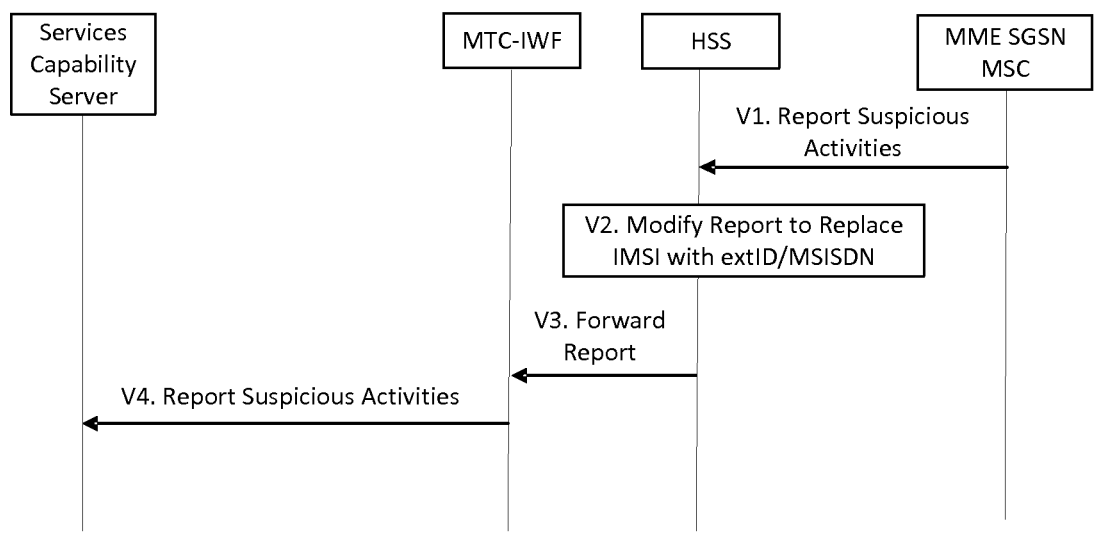
FIG. 6 illustrates a simplified call flow to report suspicious activity according to certain embodiments.

FIG. 6 illustrates a simplified call flow to report suspicious activity according to certain embodiments. In particular, FIG. 6 illustrates an approach in which reporting is via an HSS, using an interface such as S6m.

At V1, upon detection of suspicious activity based on registered event(s) the MME/SGSN/MSC can report the suspicious activity to the requestor, which is indicated as the HSS in this case. The report can include the corresponding IMSI for user equipment identification, as well as an indication of the event(s) detected, either explicitly or implicitly.

At V2, the HSS can modify the report using a stored IMSI to extID/MSISDN mapping to map the IMSI to extID/MSISDN in the report. Then, at V3, the HSS can forward the report to the requestor, which is MTC-IWF in this case.

At V4, the MTC-IWF can forward the report to the SCS. The SCS may forward this to the corresponding application server that is eventually responsible for alerting the user or, as noted above, to a law enforcement agency.

Embodiments can have various impacts on monitoring service due to user equipment mobility. In a traditional mobile network, the user equipment can reselect to another cell either due to change in the radio frequency (RF) conditions of the current serving cell, such as when a truck crosses the signal path and fades the signal towards the user equipment, or due to physical movement of the device itself. When these or similar events happen, the user equipment can perform a handover from one cell to another cell. This handover may cause a change in the serving node (MSC, MME, SGSN).

If the user equipment is registered for monitoring service and is within the validity time for the registered service, then the serving node can forward this information as part of the user equipment context to the new serving node to ensure that the new serving node continues to perform monitoring activities. If the new serving node does not support monitoring service or it is a legacy node, then the new serving node may either fail the registration or ignore the registration. Failure can then be reported to the IWF and SCS, either by the new serving node or the old serving node, to ensure that the user is alerted and can take appropriate action.

Certain embodiments can also apply to a general monitoring service beyond MTC devices when a MTC-IWF is not deployed, for example. Monitoring service can be provided in the serving nodes or in the HSS and can generally be applied for all devices, including for example regular phones, as well as being applied in a circuit switched (CS) domain.

An IWF in the above call flows, illustrated in FIGS. 3 through 6, can be modified to serve as an application server/monitoring server in the operator's network. In this case, the application server/monitoring server can directly register with the HSS, or could even be co-located with the HSS, and/or with the serving nodes. Registering with the HSS can avoid exposing the internal network topology of the visited network to different servers in the home network.

As an alternative, the network operator may decide to monitor certain events at all devices or according to certain device categories, such as all MTC devices, all smart phones, all iPhones, all dongles, and so forth. To enable this functionality, the subscription data in the HSS can contain the necessary information and the network can request the device identity from the user equipment. Subscription information can be downloaded to the serving nodes, such as MME, SGSN and MSC, during device registration, requesting the serving nodes to detect certain events and report to a pre-configured application server, or the serving nodes can simply add this information to charging or other records.

Certain embodiments can provide the ability for the networks to dynamically detect suspicious activities and report to the user subscribed for this service. Since many MTC devices may be present in unmanned location, sending personnel to monitor the device regularly requires human labor hours. Moreover, certain embodiments can provide a safety net in identifying suspicious activities as soon as they occur, hence increasing the chance of recovering a stolen device, or stopping hacking of a device.

Certain embodiments can use direct interfaces between MTC-IWF and the serving nodes, HSS and the serving nodes. Moreover, certain embodiments can monitor MSISDN-less devices in a "PS-only" deployment with a PS-only subscription. The same approach can be applied for monitoring devices with MSISDN in "CS" deployment with CS subscription.

This kind of monitoring service can be offered by mobile network operators (MNOs) to their subscribers, both for machine to machine (M2M) devices and normal devices, to reduce theft and vandalism.

Figure 7:
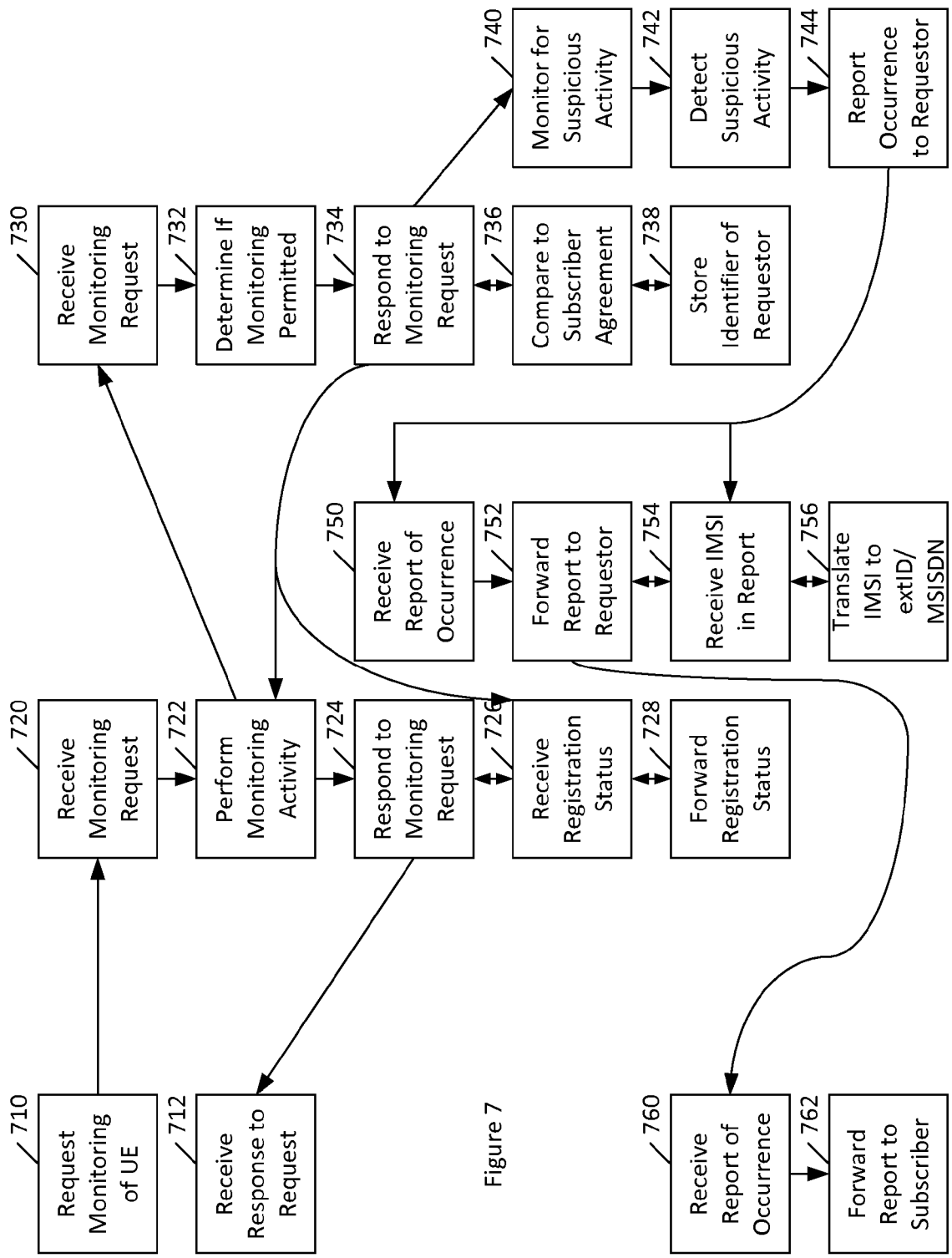
FIG. 7 illustrates a method according to certain embodiments.

FIG. 7 illustrates a method according to certain embodiments. As illustrated in FIG. 7, a method can include, at 720, receiving a monitoring request regarding a user equipment or a category of devices. The method can also include, at 722, performing a monitoring activity regarding the user equipment or the category of devices with respect to at least one suspicious event. The method can further include, at 724, responding to the monitoring request indicating whether monitoring will be performed for the user equipment or the category of devices.

The suspicious event can include at least one event of the following: a tracking update occurs from a location outside an area allowed for the user equipment or from a certain device category; the user equipment or the device category accesses a network outside an allowed time interval or at a forbidden time interval; the user equipment or the device category is subscribed for packet switched services only but is performing a location update to obtain voice service; or the user equipment or the device category has exceeded an allowed data usage limit One example of a device category is the category of all smart phones, or all smart phones of a particular make or model. Other device categories can include all MTC devices, all regular phones, all smart meters, all tablets, or all dongles.

The monitoring activity can include selecting a serving node for monitoring services and registering the user equipment or the category of devices for monitoring service with the serving node.

The method can additionally include, at 726, receiving a registration status response in response to the registering and, at 728, forwarding the registration status toward a source of the monitoring request while responding to the monitoring request.

The method can also include, at 710, requesting monitoring of a user equipment or a category of devices with respect to at least one suspicious event. The method can further include, at 712, receiving a response to the monitoring request, wherein the response indicates a registration status of the monitoring.

The requesting monitoring can include sending a monitoring request to a machine type communication interworking function.

The method can further include at 730, receiving a request for monitoring a user equipment or category of devices with respect to at least one suspicious event. The method can also include, at 732, determining whether the monitoring is permitted. The method can further include, at 734, responding to the request based on whether the monitoring is permitted.

The method can additionally include, at 736, determining whether monitoring is permitted under a subscriber agreement corresponding to the user equipment, wherein the responding is based on the subscriber agreement of the user equipment. The method can also include, at 738, storing an identifier of the requestor of the monitoring.

The method, moreover, can include at 740, monitoring for a suspicious event with respect to a user equipment or a category of devices for which monitoring has been requested by a requestor. The method can also include, at 742, detecting an occurrence of the suspicious event with respect to the user equipment or the category of devices. The method can further include, at 744, reporting the occurrence to the requestor.

The reporting can include sending an indication of the user equipment's international mobile subscriber identity to the requestor.

The method can also include, at 750, receiving a report of suspicious activity with respect to a user equipment or a category of devices for which monitoring has been requested by a requestor. The method can further include, at 752, forwarding the report of the suspicious activity to the requestor.

The method can additionally include, at 754, receiving, in the report, a user equipment's international mobile subscriber identity. The method can also include, at 756, translating the user equipment's international mobile subscriber identity to an external identifier or mobile subscriber integrated services digital network number.

The method additionally can include, at 760, receiving a report of suspicious activity with respect to a user equipment or a category of devices for which monitoring has been requested by a user or subscriber of the user equipment. The method can also include, at 762, reporting the suspicious activity to the user or the subscriber.

Figure 8:
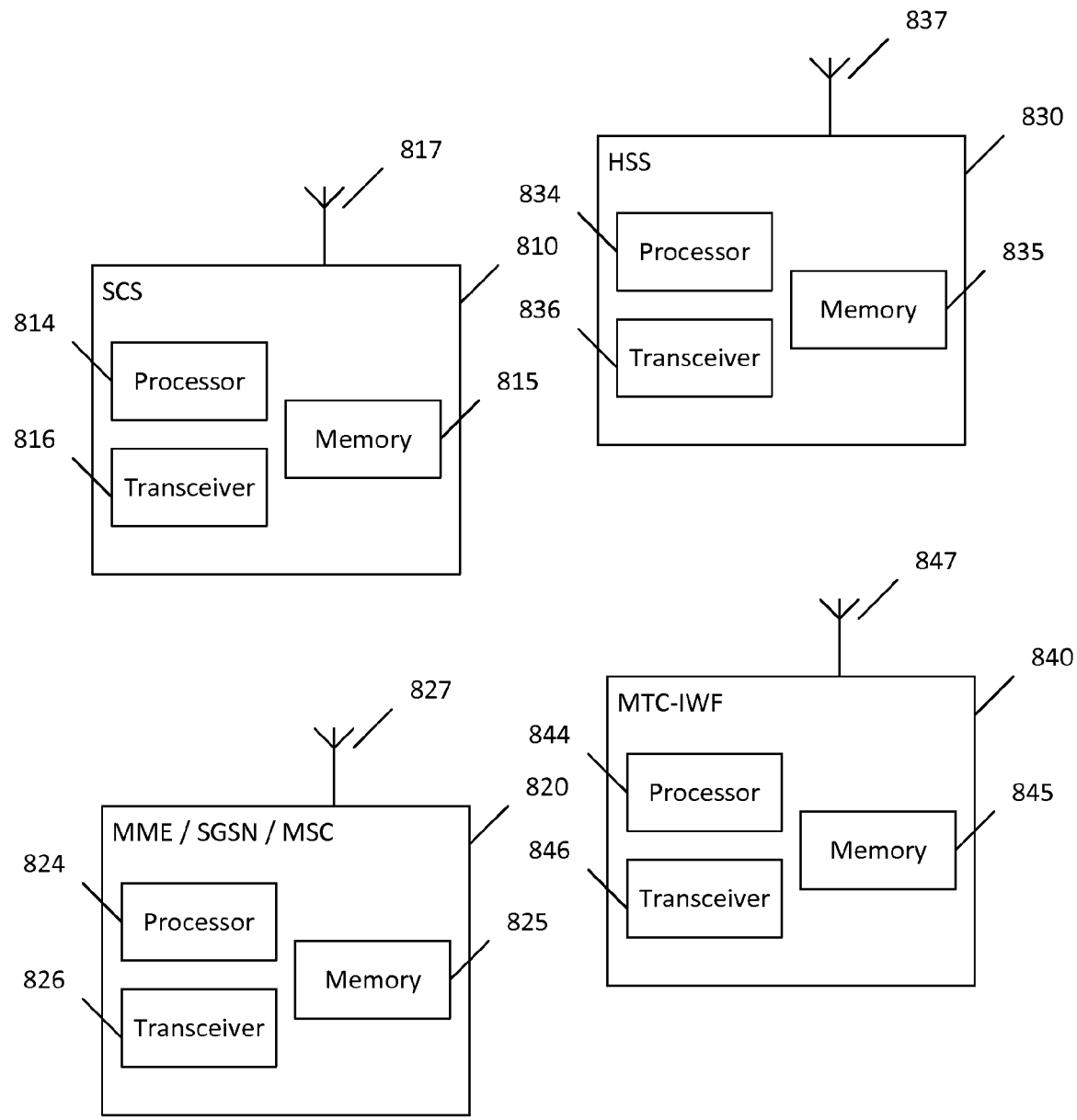
FIG. 8 illustrates a system according to certain embodiments.

FIG. 8 illustrates a system according to certain embodiments of the invention. In one embodiment, a system may include two devices, such as, for example, SCS 810, MME/SGSN/MSC 820, HSS 830, and MTC-IWF 840. Each of these devices may include at least one processor, respectively indicated as 814, 824, 834, and 844. At least one memory is provided in each device, and indicated as 815, 825, 835, and 845, respectively. The memory may include computer program instructions or computer code contained therein. Transceivers 816, 826, 836, and 846 are provided, and each device may also include an antenna, respectively illustrated as 817, 827, 837, and 847. Other configurations of these devices, for example, may be provided. For example, SCS 810, MME/SGSN/MSC 820, HSS 830, and MTC-IWF 840 may be configured for wired communication, rather than wireless communication, and in such a case antennas 817, 827, 837, and 847 would illustrate any form of communication hardware, without requiring a conventional antenna.

Transceivers 816, 826, 836, and 846 can each, independently, be a transmitter, a receiver, or both a transmitter and a receiver, or a unit or device that is configured both for transmission and reception.

Processors 814, 824, 834, and 844 can be embodied by any computational or data processing device, such as a central processing unit (CPU), application specific integrated circuit (ASIC), or comparable device. The processors can be implemented as a single controller, or a plurality of controllers or processors.

Memories 815, 825, 835, and 845 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate therefrom. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as SCS 810, MME/SGSN/MSC 820, HSS 830, or MTC-IWF 840, to perform any of the processes described above (see, for example, FIGS. 3-7). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 8 illustrates a system including an SCS, MME/SGSN/MSC, HSS, and MTC-IWF, embodiments of the invention may be applicable to other configurations, and configurations involving additional elements, as illustrated herein.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

GLOSSARY OF ABBREVIATIONS

IMSI—International Mobile Subscriber Identity
M2M, MTC—Machine Type Communication
OA&M—Operation, Administration and Maintenance
SIMTC—System Improvements for Machine Type Communication (3GPP Rel-11 work item)
SCS—Services Capability Server
IWF—Interworking Function
extID—External Identifier (could be NAI, URI or FQDN)
MSISDN—Mobile Subscriber Integrated Services Digital Network Number
UE—User Equipment

We claim:
1. A method in a cellular network, comprising:
receiving a monitoring request regarding a user equipment;
performing a monitoring activity regarding the user equipment with respect to at least one suspicious event; and responding to the monitoring request indicating whether monitoring will be performed for the user equipment,
wherein the monitoring activity comprises selecting a serving node for monitoring services and registering the user equipment for monitoring service with the serving node, the method further comprising
receiving a registration status response in response to the registering; and
forwarding the registration status toward a source of the monitoring request while responding to the monitoring request,
wherein the suspicious event comprises at least one event of the following: a tracking update, accessing a network, location update, or exceeding a data usage limit.

2. The method of claim 1, wherein the suspicious event comprises at least one event of the following: the tracking update occurs from a location outside an area allowed for the user equipment or from a certain device category; the user equipment or the device category accesses the network outside an allowed time interval or at a forbidden time interval; the user equipment or the device category is subscribed for packet switched services only but is performing the location update to obtain voice service; or the user equipment or the device category has exceeded the data usage limit.

3. The method of claim 1, wherein the device category comprises a category of at least one of the following: smart phones, regular phones, machine type devices, smart meters, tablets, or dongles.

4. A method in a cellular network, comprising:
requesting monitoring of a user equipment with respect to at least one suspicious event; and
receiving a response to the monitoring request, wherein the response indicates a registration status of the monitoring,
wherein the monitoring comprises selecting a serving node for monitoring services and registering the user equipment for monitoring service with the serving node, the method further comprising
receiving a registration status response in response to the registering; and
forwarding the registration status toward a source of the monitoring request while responding to the monitoring request,
wherein the suspicious event comprises at least one event of the following: a tracking update, accessing a network, location update, or exceeding a data usage limit.

5. The method of claim 4, wherein the requesting monitoring comprises sending a monitoring request to a machine type communication interworking function.

6. A method in a cellular network, comprising:
receiving a request for monitoring a user equipment with respect to at least one suspicious event;
determining whether the monitoring is permitted; and
responding to the request based on whether the monitoring is permitted,
wherein the monitoring comprises selecting a serving node for monitoring services and registering the user equipment for monitoring service with the serving node, the method further comprising
receiving a registration status response in response to the registering; and
forwarding the registration status toward a source of the monitoring request while responding to the monitoring request,
wherein the suspicious event comprises at least one event of the following: a tracking update, accessing a network, location update, or exceeding a data usage limit.

7. The method of claim 6, further comprising:
determining whether monitoring is permitted under a subscriber agreement corresponding to the user equipment, wherein the responding is based on the subscriber agreement of the user equipment.

8. The method of claim 7, further comprising:
storing an identifier of the requestor of the monitoring.

9. A method in a cellular network, comprising:
monitoring for a suspicious event with respect to a user equipment for which monitoring has been requested by a requestor;
detecting an occurrence of the suspicious event with respect to the user equipment; and
reporting the occurrence to the requestor,
wherein the monitoring comprises selecting a serving node for monitoring services and registering the user equipment for monitoring service with the serving node, the method further comprising
receiving a registration status response in response to the registering; and
forwarding the registration status toward a source of the monitoring request while responding to the monitoring request,
wherein the suspicious event comprises at least one event of the following: a tracking update, accessing a network, location update, or exceeding a data usage limit.

10. The method of claim 9, wherein the reporting comprises sending an indication of the user equipment's international mobile subscriber identity to the requestor.

11. The method of claim 9, wherein the reporting comprises sending a report to a machine type communication interworking function.

12. A method in a cellular network, comprising:
receiving a report of suspicious activity with respect to a user equipment for which monitoring has been requested by a requestor; and
forwarding the report of the suspicious activity to the requestor,
wherein the monitoring comprises selecting a serving node for monitoring services and registering the user equipment for monitoring service with the serving node, the method further comprising
receiving a registration status response in response to the registering; and
forwarding the registration status toward a source of the monitoring request while responding to the monitoring request,
wherein the suspicious activity comprises at least one event of the following: a tracking update, accessing a network, location update, or exceeding a data usage limit.

13. The method of claim 12, further comprising:
receiving, in the report, a user equipment's international mobile subscriber identity; and
translating the user equipment's international mobile subscriber identity to an external identifier or mobile subscriber integrated services digital network number.

14. The method of claim 4, wherein the suspicious event comprises at least one event of the following: the tracking update occurs from a location outside an area allowed for the user equipment or from a certain device category; the user equipment or the device category accesses the network outside an allowed time interval or at a forbidden time interval; the user equipment or the device category is subscribed for packet switched services only but is performing the location update to obtain voice service; or the user equipment or the device category has exceeded the data usage limit.

15. The method of claim 6, wherein the suspicious event comprises at least one event of the following: the tracking update occurs from a location outside an area allowed for the user equipment or from a certain device category; the user equipment or the device category accesses the network outside an allowed time interval or at a forbidden time interval; the user equipment or the device category is subscribed for packet switched services only but is performing the location update to obtain voice service; or the user equipment or the device category has exceeded the data usage limit.

16. The method of claim 9, wherein the suspicious event comprises at least one event of the following: the tracking update occurs from a location outside an area allowed for the user equipment or from a certain device category; the user equipment or the device category accesses the network outside an allowed time interval or at a forbidden time interval; the user equipment or the device category is subscribed for packet switched services only but is performing the location update to obtain voice service; or the user equipment or the device category has exceeded the data usage limit.

17. The method of claim 12, wherein the suspicious event comprises at least one event of the following: the tracking update occurs from a location outside an area allowed for the user equipment or from a certain device category; the user equipment or the device category accesses the network outside an allowed time interval or at a forbidden time interval; the user equipment or the device category is subscribed for packet switched services only but is performing the location update to obtain voice service; or the user equipment or the device category has exceeded the data usage limit.

* * * * *